US005381246A

United States Patent [19]

Suzuki et al.

[11] Patent Number: 5,381,246

[45] Date of Patent: Jan. 10, 1995

[54] IMAGE PROCESSING SYSTEM FOR CONVERTING A FULL COLOR IMAGE INTO A PSEUDO-COLOR CMY DOT REPRESENTATION

[75] Inventors: Manabu Suzuki; Hajime Tatsuzawa, both of Kanagawa, Japan

[73] Assignee: Mutoh Industries, Ltd., Tokyo, Japan

[21] Appl. No.: 162,981

[22] Filed: Dec. 8, 1993

[30] Foreign Application Priority Data

Dec. 8, 1992 [JP] Japan .................................. 4-351831

[51] Int. Cl.[6] ......................... H04N 1/46; G03F 3/08; G03F 3/10

[52] U.S. Cl. .................................... 358/500; 358/518; 358/515; 358/527; 358/523; 358/504

[58] Field of Search ............... 358/500, 523, 518, 527, 358/448, 447, 408, 400, 501, 504, 515

[56] References Cited

U.S. PATENT DOCUMENTS 4,622,582 11/1986 Yamada ............................... 358/408
4,868,670 9/1989 Morton ............................... 358/447
5,267,030 11/1993 Giorgianni .......................... 358/527

*Primary Examiner*—Edward L. Coles, Sr.
*Assistant Examiner*—Allan A. Esposo
*Attorney, Agent, or Firm*—Lowe, Price, LeBlanc & Becker

[57] ABSTRACT

A pseudo-color image output system has an image input unit for reading a full-color image and outputting multi-valued data of three primary colors, and an image output unit for digitizing the multi-valued data of three primary colors output from the image input unit and for outputting the pseudo-color image by controlling a total area of color dots in a unit area. The image output unit has a plurality of three-dimensional color compensation tables each provided for every type of the image input units connectable to the image output unit, for compensating errors between output and input colors and selector for selecting one of the three-dimensional color compensation tables depending on the type of the image input unit.

6 Claims, 7 Drawing Sheets

FIG.4

| INPUT | | | OUTPUT | | |
|---|---|---|---|---|---|
| Nr | Ng | Nb | lut r | lut g | lut b |
| 0 | 0 | 0 | 1 | 2 | 1 |
| 0 | 0 | 1 | 2 | 2 | 51 |
| 0 | 0 | 2 | 1 | 1 | 104 |
| 0 | 0 | 3 | 2 | 1 | 178 |
| 0 | 0 | 4 | 2 | 2 | 240 |
| 0 | 1 | 0 | 3 | 52 | 3 |
| 0 | 1 | 1 | 2 | 55 | 55 |
| 0 | 1 | 2 | 1 | 53 | 102 |
| 0 | 1 | 3 | 1 | 51 | 169 |
| | | 4 | 2 | 51 | 220 |

FIG.5

| INPUT | | | OUTPUT | | |
|---|---|---|---|---|---|
| R | G | B | P"r | P"g | P"b |
| 0 | 0 | 0 | 2 | 5 | 3 |
| 0 | 0 | 1 | 2 | 5 | 4 |
| 0 | 0 | 2 | 2 | 6 | 4 |
| 0 | 0 | 3 | 2 | 5 | 5 |
| 0 | 0 | 4 | 3 | 5 | 6 |
| ⋮ | ⋮ | ⋮ | ⋮ | ⋮ | ⋮ |
| 0 | 0 | 255 | 23 | 42 | 252 |
| 0 | 1 | 0 | 1 | 6 | 2 |
| 0 | 1 | 1 | 1 | 5 | 4 |
| | | | | 6 | 6 |

IMAGE PROCESSING SYSTEM FOR CONVERTING A FULL COLOR IMAGE INTO A PSEUDO-COLOR CMY DOT REPRESENTATION

BACKGROUND OF THE INVENTION

The present invention relates to a pseudo-color image outputting system for reading a full-color image such as a color photograph and for outputting a pseudo color image represented by dots with a fixed dot diameter.

Dot printers printing an image by dots with a fixed dot diameter can print a color image by using color materials of Cyan (C), Magenta (M) and Yellow (Y) but cannot print an image with a gray scale (gradation). For this reason, various pseudo-color gray-scale representation methods have been developed for obtaining an output approximate to a full color image using this type of dot printers.

Fundamentally, the pseudo-color gray-scale representation methods represent various colors by changing total areas of dots of each color per unit area. More specifically, a pseudo-color gray-scale representation is implemented by digitizing three primary colors of Red (R), Green (G) and Blue (B) and color-converting into three primary colors in a CMY system represented by an output unit.

A method in which a meshed-pixel distribution method is applied to a color image has been known as the pseudo-color gray scale representation method. ("A pseudo full-color representation method taking account of a color reproduction": Yamada et al, The paper of Information Processing Society of Japan, June 1987 Vol. 28, No. 6, pp 617). According to this method, a color which is actually represented by a dot pattern of a mesh constituted by 2×2 dots output from a dot printer is obtained by referring to a preliminarily prepared lookup table (LUT). Then, an error between the color obtained from the lookup table and the color to be represented is compensated with the neighboring meshes.

This method has an advantage that an error between an actually output color and a color to be actually represented can be compensated without performing sophisticated color-mixing calculations. This method, however, requires controls of distribution and concentration of dots in order to prevent the resolution from being lowered, since the process is performed in units of meshes each constituted by 2×2 dots. Further, since an accumulation of errors will deteriorate image quality, an additional control is required. These controls will complicates the entirety of the pseudo-color gray-scale representation process. Further, areas accumulated errors of which cannot be fully controlled are caused.

In order to solve the above problem, a method has been developed in which a three-dimensional (3-D) color compensation table is prepared by using a color compensation technology of the meshed-pixel distribution method and the digitizing process is performed in units of dots by performing the color compensation using the 3-D color compensation table. ("A method for preparing a 3-D color compensation table taking account of an image I/O device in a pseudo-color gray-scale representation": Moritani et al., Institute of Electric Field Hokkaido-branch Federation Conference Lecture Papers for the fourth year of Heisei, October 1992, pp 443).

However, an application of the above-described pseudo-color gray-scale representation method to actual systems will pose the following problems.

In the actual systems, the input characteristics of the image input units (image scanners) and ink characteristics of image output units (printers) vary depending on their types. For this reason, a user must prepare the 3-D color compensation table as an initial setting process, depending on the types of the image input unit and the image output unit to be used. This initial setting process is troublesome and a user's burden is heavy. Further, in a system in which a plurality of scanners are connected to a single printer or a plurality of printers are connected to a single scanner, the above-described 3-D color compensation table must be prepared each time the scanner or the printer to be used is switched, resulting in undesirable system operation.

SUMMARY OF THE INVENTION

An object of the present invention is to provide a pseudo-color image output system which can operate without a troublesome initial setting process, irrespective of the types of the image input units and the image output units, and has a high system operability.

According to a first aspect of the present invention, a pseudo-color image output system has an image input unit for reading a full-color image and outputting multi-valued data of three primary colors, and an image output unit for digitizing the multi-valued data of three primary colors output from the image input unit and for outputting the pseudo-color image by controlling a total area of color dots in a unit area. The image output unit comprises a plurality of three-dimensional color compensation tables each provided for every type of the image input units connectable to the image output unit, for compensating an error between actually output colors and colors to be represented; and selecting means for selecting one of the three-dimensional color compensation tables depending on the type of the image input unit.

According to a second aspect of the present invention, a pseudo-color image output system has an image input unit for reading a full-color image and outputting multi-value data of three primary colors, and an image output unit for digitizing the multi-value data of three primary colors output from the image input unit and for outputting the pseudo-color image by controlling a total area of color dots in a unit area. The image input unit comprises a plurality of three-dimensional color compensation tables each provided for every types of the image output units connectable to the image input unit, for compensating an error between actually output colors and colors to be represented; and selecting means for selecting one of the three-dimensional color compensation tables depending on the type of the image output unit.

The 3-D color compensation table can be prepared as follows, for example.

All colors which can be represented by the image output unit are output as test patterns in a micro area constituted by n×n dots (n is an integer of 2 or more). These test patterns are read by the image input unit to obtain each components of the three primary colors. A table is prepared showing a relation between each components of the three primary colors and the number of dots of each color in the micro area. Uniform image data in which each pixel in a predetermined area larger than the micro area has a uniform color is generated with respect to all colors which can be input. The uniform image data is N-valued ($N=n\times n+1$) in units of the micro areas based on each components of the three primary colors of the uniform image data and the table. Then, a 3-D color compensation table is prepared from the N-valued data in the neighboring micro areas.

According to the pseudo-color image output system of the first aspect of the present invention, the image output unit is provided with the 3-D color compensation tables for compensating an error between colors actually output by the image output unit and colors to be actually represented, for each type of the image input units. Further, the image output unit is provided with means for selecting one of the 3-D color compensation table depending on the type of the image input unit to be used. Accordingly, the color compensation process can be performed by using the 3-D color compensation tables tailored to the input characteristic of the image input unit only by the selection operation of the selecting means if a manual selection is selected, and without the selection operation if an automatic selection is selected.

Further, according to the pseudo-color image output system of the second aspect of the present invention, the image input unit is provided with the 3-D color compensation tables for each type of the image output units. Further, the image input unit is provided with means for selecting one of the 3-D color compensation tables depending on the type of the image output unit to be used. Accordingly, the color compensation process can be performed by using the 3-D color compensation table tailored to the input characteristic of the image output unit only by the selection operation of the selecting means if a manual selection is selected, and without the selection operation if an automatic selection is selected.

When the 3-D color compensation table is prepared in accordance with the above described method, all the colors representable by the image output unit can be output as test patterns in the micro area (mesh) constituted by $n\times n$ dots. Then, the colors in the micro area are measured by the image input unit and each component of the three primary colors are obtained. Accordingly, the colors actually representable by the image output unit and the values obtained by reading the colors by the image input unit can be determined. Uniform image data in which each pixel in a predetermined area larger than the micro area has a uniform color, is generated with respect to all colors which can be input. The 3-D color compensation table is prepared while the uniform image data is N-valued ($N=n\times n+1$) in units of the micro areas based on each components of the three primary colors of the uniform image data and the table. For this reason, the use of the 3-D color compensation table can obtain appropriate compensation values with respect to all the colors which can be input and therefore permits the representation of colors approximated to actual colors.

BRIEF DESCRIPTION OF THE DRAWINGS

FIG. 4 is a view showing contents of averaged LUT in the method;

FIG. 5 is a view showing contents of the 3-D color compensation table according to the method;

DETAILED DESCRIPTION OF THE PREFERRED EMBODIMENTS

Prior to the explanation of the entire system according to an embodiment of the present invention, the 3-D color compensation table to be used in the present embodiment will now be described.

Figure 1:
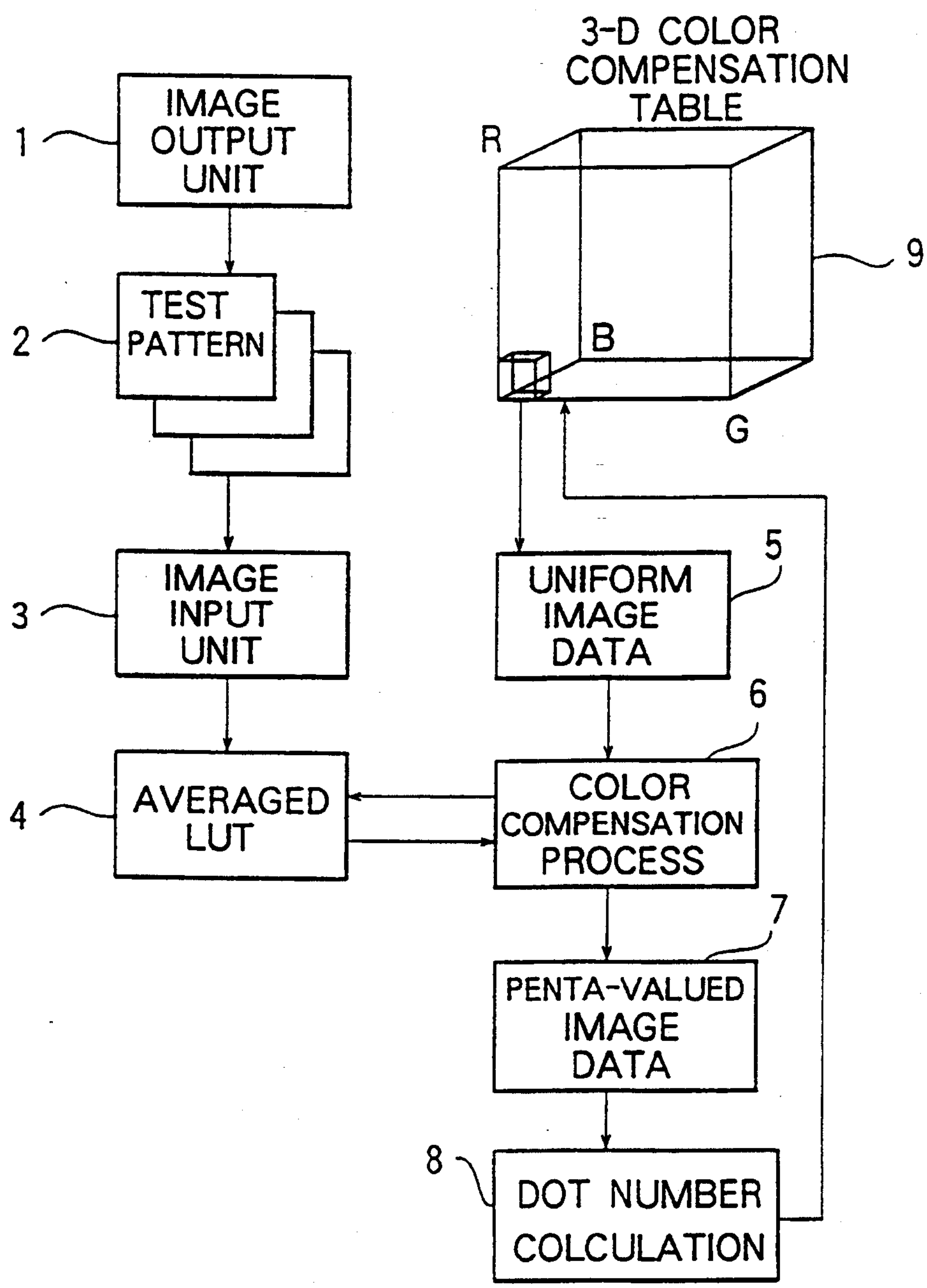
FIG. 1 is a view showing a method for preparing a 3-D color compensation table to be used in a pseudo-color image output system according to a first embodiment of the present invention.

FIG. 1 is a view for explaining a procedure of preparing the 3-D color compensation table. In the following embodiments, the procedure will be described by using a mesh constituted by $2\times 2$ dots as a micro area, and this mesh is referred to as a pixel and is distinguished from a dot.

First, all the dot patterns that the mesh of $2\times 2$ dots can have are output from the image output unit 1 to prepare test patterns 2.

Figure 2:
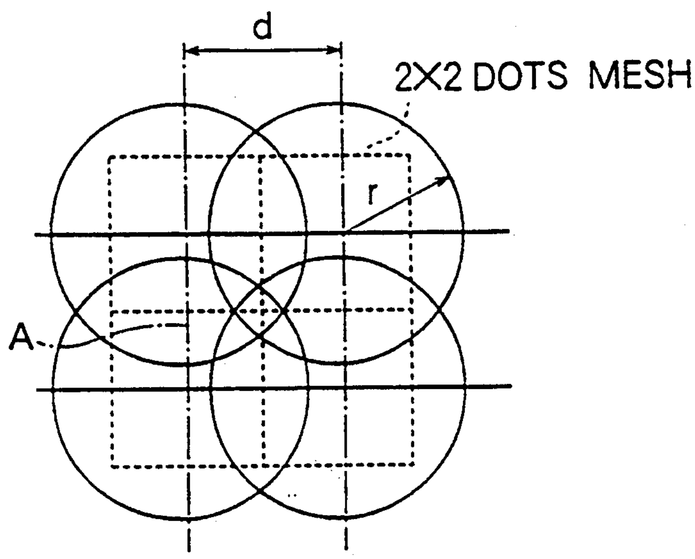
FIG. 2 is a view for explaining combination patterns of three primary color dots according to the method shown in FIG. 1.

Generally, three primary colors in a subtractive color mixture system of C (Cyan), M (Magenta), and Y (Yellow) can be output from the image output unit 1 such as a dot printer. A number of colors representable by mixing binary dot of each of C, M, and Y colors is 8 ($=2^3$). When a radius r of each of tricolors is assumed to be smaller than a distance d of adjacent dot as shown in FIG. 2, the number of dot patterns within a square area A surrounded by the lines connecting each center of four dots of the mesh constituted by $2\times 2$ dots can be determined by combinations of adjacent four dots, namely 4096 ($=8^4$). If the tricolor dots are each cylindrical, line symmetrical patterns and rotation symmetrical patterns can be ignored among the dot patterns. However, the dot patterns are not always cylindrical. Therefore, 4096 dot are output from the image output unit in this embodiment.

Figure 3:
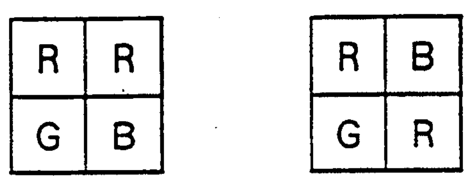
FIG. 3 is a view showing a mesh constituted by $2\times 2$ dots according to the method.

Then, the obtained 4096 test patterns are read by the image input unit 3 to measure the R, G, and B values of each pattern. Then, as shown in FIG. 3, the R, G, and B values of different patterns each having the same number of dots of R(Y+M), G(C+Y), and B(C+M) are averaged to prepare an averaged lookup table (LUT) showing RGB values (average values) with respect to each number of R, G, and B dots, as shown in FIG. 4. The number of dots placed in the mesh of $2\times 2$ dots are 0 through 4 with respect to each of R, G, and B, and therefore, a number of averaged LUTs will be 125 ($=5^3$).

Then, uniform image data 5 in which all the pixels in a predetermined area have a uniform color (i.e., a same color) with respect to all the colors which can be input, is generated in a memory of a computer. For example, when a full-color image is represented with 256 gray scales with respect to each of R, G, and B, images constituted by i×j pixels are sequentially generated with respect to all the colors (16777216 colors). In other words, the image data in which each of i×j pixels has a same pixel value (color) is generated with respect to all the colors within the RGB space. The larger the values i and j is, the more accurate the compensation values are. Accordingly, the values i and j are determined while taking account of the processing time.

If it is difficult to prepare tables with respect to all the colors within the RGB space from a view point of a memory capacity, the RGB space can be divided appropriately.

Then, each component of R, G, and B of the generated uniform image data 5 is subjected to a color compensation processing 6.

First, the weighted average of the error er(x', y') of periphery-processed pixels is added to the original pixel values Pr(x,y) with respect to the R component of the uniform image data 5, to obtain the compensated pixel values Pr'(x,y), as shown in equation (1).

$$Pr'(x,y) = Pr(x,y) + \sum_{x=-2}^{2}\sum_{y'=0}^{2} er(x-x',y-y')m(x',y') \tag{1}$$

$$m(x',y') = \begin{pmatrix} 1 & 2 & 3 & 2 & 1 \\ 2 & 3 & 4 & 3 & 2 \\ 3 & 4 & * & & \end{pmatrix} \tag{2}$$

where * represents a target pixel.

The obtained compensated pixel values Pr'(x,y) are subjected to a penta-valued processing. More specifically, when a threshold value is represented as Tn, the penta-valued data Nr(x,y) is defined by the following equation (3) and (4).

$$\text{If } Tn \leqq Pr'(x,y) < Tn+1 \ (n=0, 1, \ldots, 4) \tag{3}$$

$$\text{Then, } Nr(x,y)=n \tag{4}$$

Similarly, the penta-valued data Ng(x,y), Nb(x,y) are obtained with respect to the G and B components, respectively.

Each of the penta-valued data Nr(x,y), Ng(x,y) and Nb(x,y) takes a value ranged 0 through 4 and corresponds to the number of respective color dots within the mesh of 2×2 dots. Note that since this processing does not include the digitizing processing as in the meshed-pixel distribution method, dots are not required to be distributed within the mesh. That patterns each having the same number of dots are uniformed when the above-described averaged LUT 4 is prepared, is due to taking account of that the dots are not required to be distributed.

The error er(x,y) is obtained from the reference values lutr[Nr(x,y), Ng(x,y), Nb(x,y)] and the compensated pixel value Pr'(x,y) and in accordance with the equation (5).

$$er(x,y)=Pr'(x,y)-lutr[Nr(x,y),Ng(x,y),Nb(x,y)] \tag{5}$$

This error is used for gray scale compensation to be described later.

Similarly, errors eg(x,y) and eb(x,y) are obtained with respect to G and B components, respectively. Although an accumulation of errors may be caused during the processing, the control therefore is not performed. Due to this, the uniform image data 5 is converted into penta-valued image data 7 taking account of the I/O device characteristic of five gray scales of each of R, G, and B.

Then, the penta-valued image data 7 thus obtained is subjected to dot-number calculation 8 for averaging the entirety of i×j pixels as shown in the equation (6), to thereby obtain the compensated data Pr''(r,g,b).

$$Pr''(r,g,b) = \sum_{x=0}^{i-1}\sum_{y=0}^{j-1} Nr(x,y)/4ij \tag{4}$$

where, r, g, and b are each input pixel value. This compensated data Pr''(r,g,b) is registered in the 3-D color compensation table 9 with 256 gray scales. Similarly, the compensated data Pg''(r,g,b) and Pb''(r,g,b) are obtained with respect to the G and B components, respectively. FIG. 5 shows an example of the contents of the obtained 3-D color compensation table 9.

A system according to the embodiment using the 3-D color compensation table thus obtained will now be described.

Figure 6:
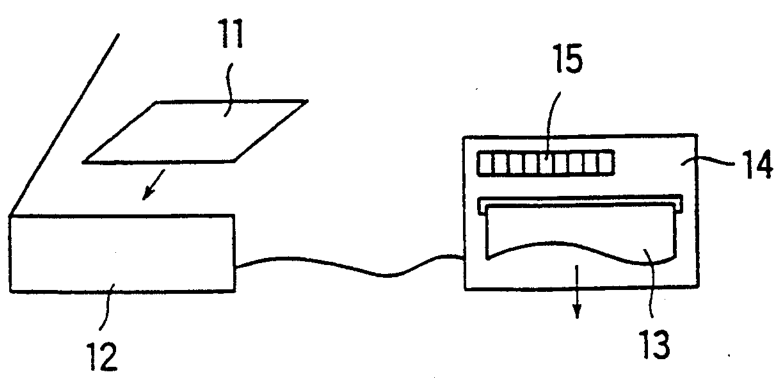
FIG. 6 is a view showing a schematic arrangement of the system.

This system comprises, as shown in FIG. 6, an image scanner 12 for inputting an original full color image 11 and for outputting RGB multi-valued image data; and a dot printer 14 for inputting the RGB multi-valued image data output from the image scanner 12, performing the color compensation using the 3-D color compensation table and the digitizing process with respect to the input RGB multi-valued image data, and for outputting a pseudo full-color image 13 represented by the dots of the ink in the CMY system. Keys for selecting types of the image scanner 12 to be connected are provided on the panel of the dot printer 14.

Figure 7:
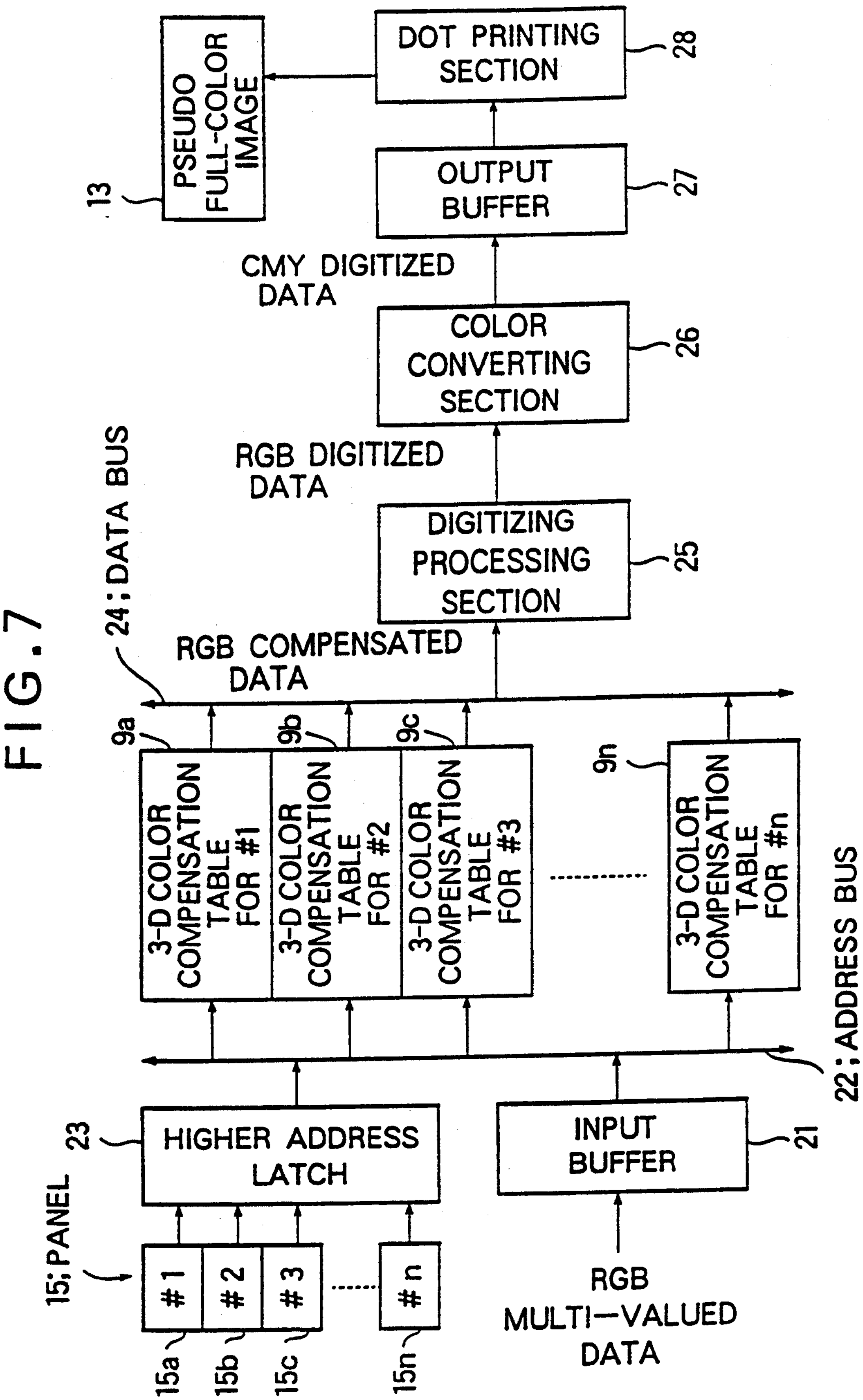
FIG. 7 is a block diagram showing a schematic arrangement of a dot printer to be used in the system.

FIG. 7 is a block diagram showing a schematic arrangement of the dot printer 14.

The RGB multi-valued data obtained by reading the original full-color image 11 by the image scanner 12 is temporarily stored in the input buffer 21. The 3-D color compensation tables **9*a* through 9*n* are prepared to be tailored to the types of the image scanner 12 connectable to the dot printer 14 and stored in a read only memory (ROM). Although the image input characteristic of the image scanner varies depending on the type of the image scanner 12, it does not vary remarkably among the same type of scanners. From a view point of the fact, the 3-D color compensation tables 9*a* through 9*n*** are prepared in accordance with the above described procedures with respect to each type of the scanner in order to perform optimum color compensation tailored to each type.

The type data of the image scanner designated by the depression of the keys **15*a*, 15*b*, 15*c*, . . . , 15*n* on the panel 15 is stored in a higher address latch 23 as a higher address for selecting the 3-D color compensation tables 9*a* through 9*n*. The type data stored in the higher address latch 23 is output onto the address bus 22 for accessing the 3-D color compensation tables 9*a* through 9*n*, together with the multi-valued data stored in the input buffer 21**.

When the RGB multi-valued data is supplied to the 3-D color compensation table **9*i* selected by the higher address, the color-compensated RGB data is output onto the data bus 24** from the 3-D color compensation table 9*i*. The RGB color compensated data is digitized by the digitizing processing section 25.

A least mean error method is preferable as the digitizing processing, for example. According to this method, a mean of errors e(x,y) between data Q(x,y) and the digitized output D(x,y) (=0 or 1) is reduced. The data Q(x,y) is obtained by compensating the compensation data P″(x,y) [$0 \leq P''(x,y) \leq 1$] output from the 3-D color compensation table, by the weighted means of the digitized errors of the periphery-processed dots. For example, the threshold value T(x,y) of the target dot is determined by the weighted mean of the errors of the periphery-processed dots in accordance with the equation (7).

$$T(x,y) = 1/2 + \sum_{x'=-2}^{2} \sum_{y'=0}^{2} e(x-x',y-y')m(x',y') \Big/ \sum_{x'=-2}^{2} \sum_{y'=0}^{2} m(x',y') \qquad (7)$$

where m(x′,y′) is a matrix such as shown in equation (2). The important thing is that the above described digitizing method allows a process in units of dots. For this reason, the digitizing process excludes the controls of distributing and concentrating the dots as in the conventional meshed-pixel color distribution method, and can obtain an output result of extremely smooth and higher resolution.

The digitized RGB data thus obtained is converted into the digitized CMY data or digitized CMYK (K is a black) data by the color converting section 26 and supplied to the dot printing section 28 through the output buffer 27. Then, the dot printing section 28 outputs the pseudo full-color image 13.

As described above, according to the present invention, the dot printing section 14 is provided with the 3-D color compensation tables 9*a* through 9*n* tailored to the types of the image scanner 12 and one of the tables 9*a* through 9*n* can be selected by the operation of the panel 15 depending on the type of the image scanner 12. Accordingly, the initial setting operation is easy and the pseudo full-color image which is superior in the color reproduction can be obtained.

Figure 8:
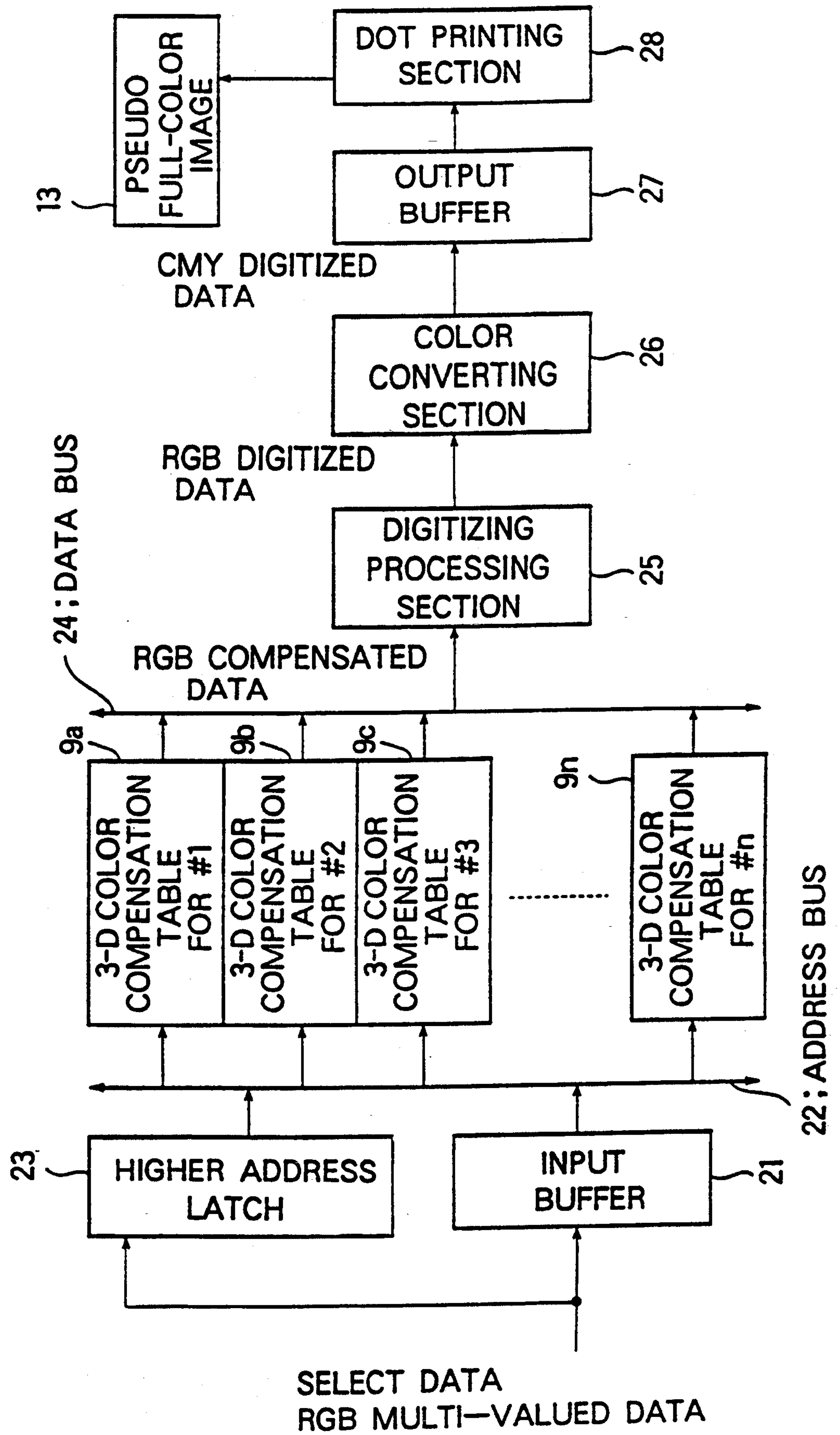
FIG. 8 is a block diagram showing a schematic arrangement of a dot printer in a pseudo-color image output system according to a second embodiment of the present invention.

FIG. 8 is a view showing an arrangement of a dot printer to be used in a pseudo-color image output system according to a second embodiment of the present invention. The same reference numerals as in FIG. 7 denote the same parts in FIG. 8, and a detailed description thereof will be omitted.

In the first embodiment shown in FIG. 7, the 3-D color compensation table 9*i* tailored to the image scanner 12 to be used is selected by the operation of the panel 15. In the second embodiment shown in FIG. 8, the 3-D color compensation table can be selected without the operation of the panel. For this reason, select data for specifying the type is supplied to the dot printer 14 prior to the supplement of the RGB multi-valued data. This select data is stored in the higher address latch 23 as the higher address for selecting the 3-D color compensation table 9*i*.

According to the second embodiment, the 3-D color compensation table 9*i* can be automatically selected. Accordingly, the selection operation is not needed, and thus user's load can be further reduced.

Figure 9:
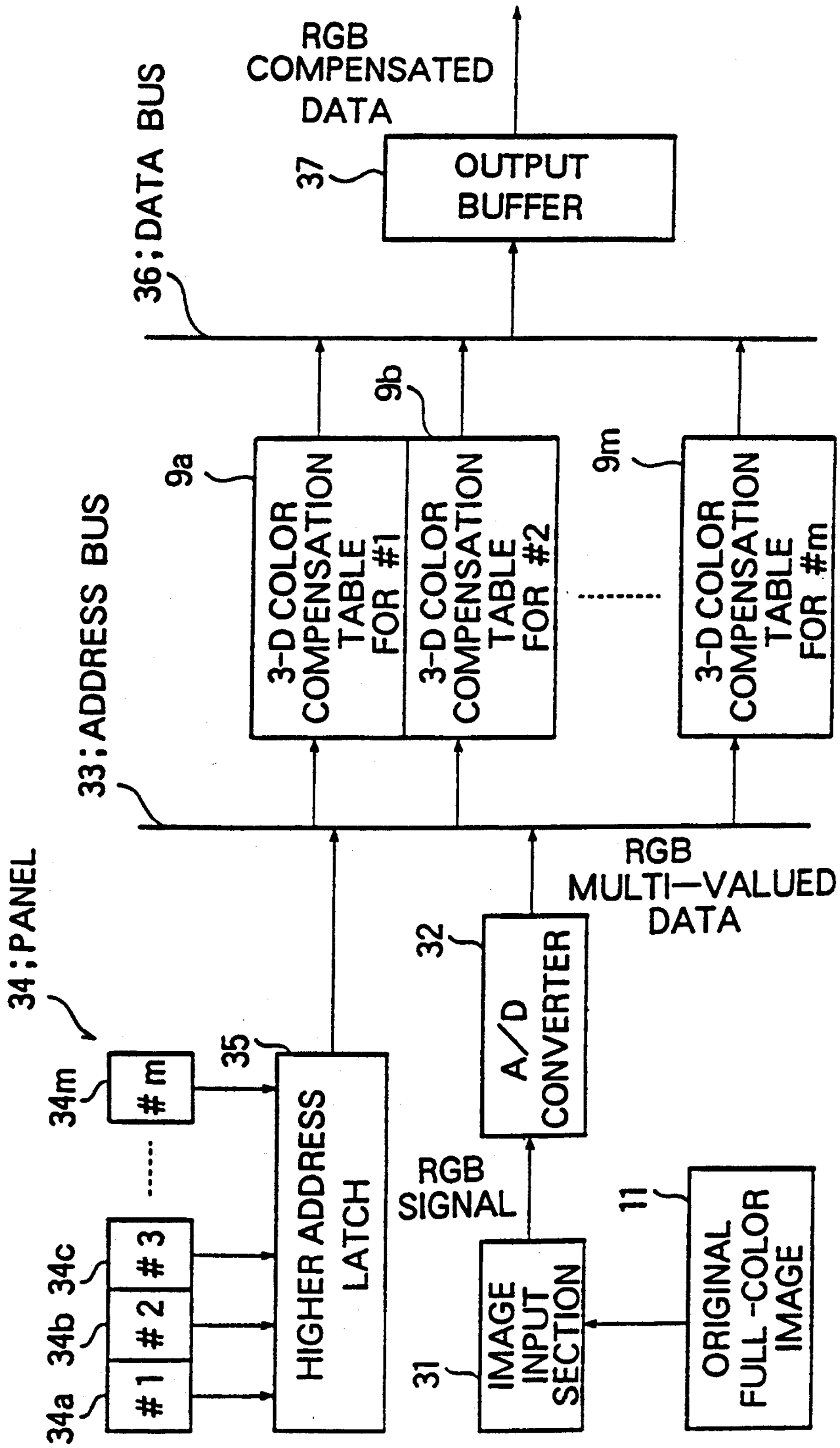
FIG. 9 is a block diagram showing a schematic arrangement of an image scanner in a pseudo-color image output system according to a third embodiment of the present invention.

FIG. 9 is a block diagram showing a schematic arrangement of an image scanner to be used in a pseudo-color image output system according to a third embodiment of the present invention.

In the first and second embodiments, the dot printer 14 is provided with the 3-D color compensation tables 9*a* through 9*n* tailored to the types of the image scanner 12. In the third embodiment, the image scanner 12 is provided with the 3-D color compensation tables 9*a* through 9*m* tailored to the types of the dot printers 14.

The RGB components of the original full-color image 11 are read out by the image input section 13. The obtained RGB signals are A/D converted by the A/D converting section 32, and thus obtained RGB multi-valued data is output onto the address bus for selecting the 3-D color compensation tables 9*a* through 9*m*. The image scanner 12 has a panel 34 on which keys 34*a* through 34*m* for selecting the types of the dot printer are provided. The data of the selected key 34*a* through 34*m* is output onto the address bus 33 through the higher address latch 35 as the higher address for selecting the 3-D color compensation tables 9*a* through 9*m*. The RGB compensated data output from the selected 3-D color compensation table 9*j* is supplied to the dot printer 14 through the data bus 36 and the output buffer 37.

The third embodiment eliminates the 3-D color compensation tables provided in the dot printer 14 and permits the process to start from the digitizing processing.

Figure 10:
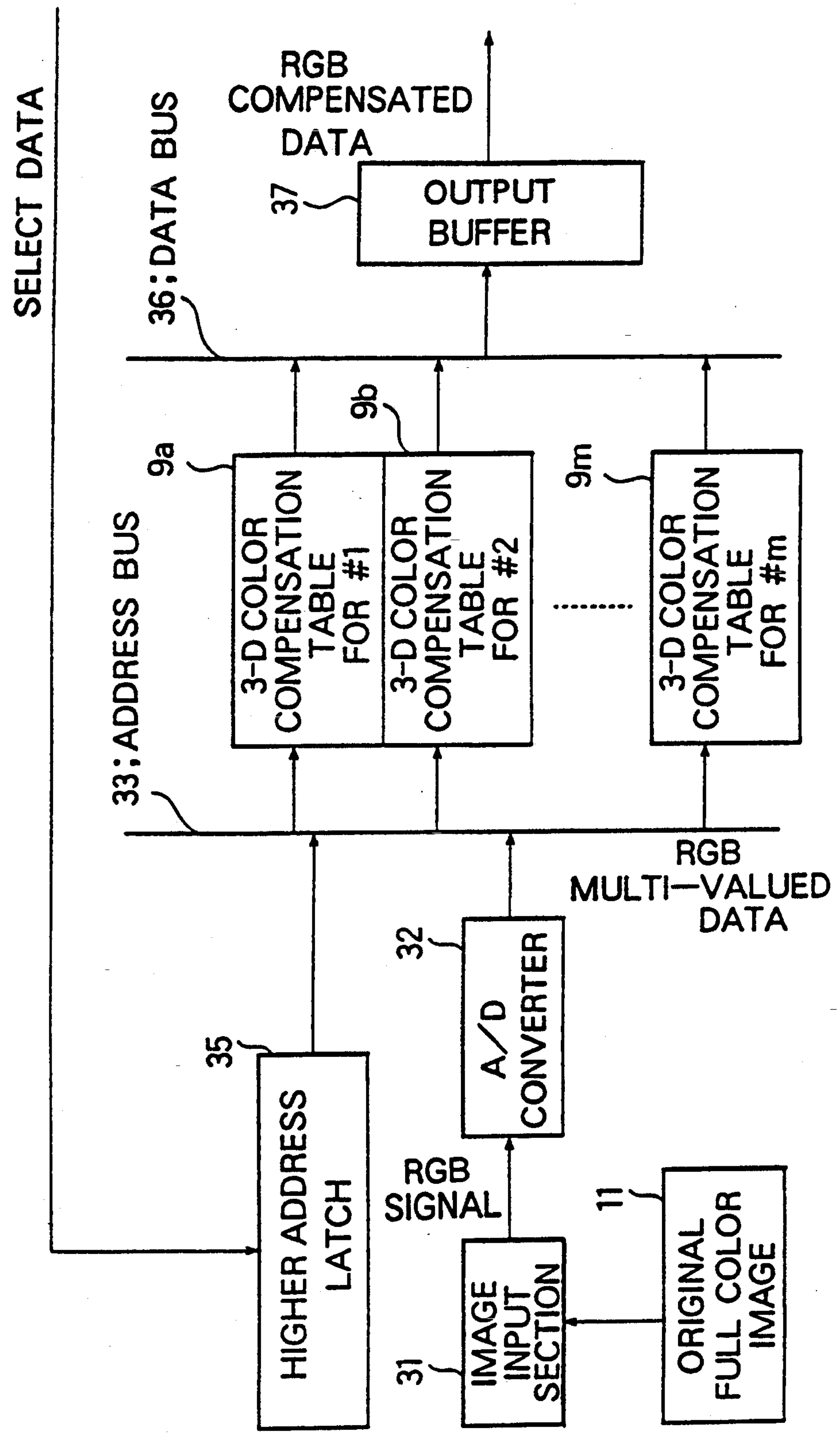
FIG. 10 is a block diagram showing a schematic arrangement of an image scanner in a pseudo-color image output system according to a fourth embodiment of the present invention.

FIG. 10 is a block diagram showing a schematic arrangement of the image scanner in a pseudo-color image output system according to a fourth embodiment of the present invention. The same reference numerals as in FIG. 9 denote the same parts in FIG. 10, and therefore the description thereof will be omitted.

In the third embodiment shown in FIG. 9, the 3-D color compensation table 9*i* tailored to the dot printer 14 to be used is selected by the operation of the panel 34. The fourth embodiment shown in FIG. 10 eliminates the panel operation. More specifically, prior to the supplement of the RGB compensation data, the select data specifying the type of the dot printer 14 is supplied to the image scanner 12 from the dot printer 14. This select data is stored in the higher address latch 35 as the address for selecting the 3-D color compensation table 9*i*.

Since the 3-D color compensation table 9*i* can be automatically selected, the fourth embodiment also eliminates the selection operation and can reduce the user's load.

In each of the above embodiments, the mesh of 2×2 dots is used as a micro area when preparing the 3-D color compensation tables. A mesh having a larger size may be used. However, when the larger mesh is used, the number of colors representable by the image output unit is increased exponentially. Accordingly, an increase of a number of test patterns must be taken account of. Further, besides the above described least average error method, other dot-based digitizing methods such as an error diffusion method may be used.

As has been described above, according to the present invention, the 3-D color compensation tables for compensating the errors between the colors actually output by the image output unit and the colors to be represented actually are provided tailored to the types of the image input unit or the types of the image output unit. The selection of the tables permits appropriate color compensation process to be executed depending on the characteristic of the image input unit or the image output unit. Accordingly, a load of the initial setting operation can be reduced drastically.

What is claimed is:

1. A pseudo-color image output system, comprising:

a plurality of image input units for reading a full-color image and outputting RGB multi-valued data of three primary colors; and an image output unit for digitizing the RGB multi-valued data of three primary colors output from the image input unit and for outputting a pseudo-color image by controlling a total area of color dots in a unit area, the image output unit including:

input buffer means for temporarily storing the RGB multi-valued data supplied from the image input unit;

a plurality of three-dimensional color compensation tables, one for each type of image input unit connectable to the image output unit, for compensating errors between the output and input colors; and selecting means for selecting one of the three-dimensional color compensation tables depending on the type of the image input unit;

digitizing means for digitizing the RGB multi-valued data which is color-compensated by one of the three-dimensional color compensation tables selected by the selecting means, and for outputting a digitized RGB data;

color converting means for converting the digitized RGB data to digitized color data for printing; and printing means for printing out the pseudo-color image by use of the digitized color data, wherein each of the three-dimensional color compensation tables is prepared through the operation of:

preparing a plurality of test patterns output from the image output unit, the test patterns including all dot patterns which can be represented by the image output unit, each of the dot patterns being a mesh constituted by $n \times n$ dots (n is an integer of 2 or more) and defined by N-values ($N = n \times n + 1$) with respect to each of RGB;

reading the test patterns by the image input unit to measure the R, G and B values of each test pattern;

preparing a look-up table showing a relation between the RGB values of the mesh of the test patterns and the RGB values actually measured for the test patterns;

generating a plurality of uniform image data with respect to all colors which can be input as original pixels, each uniform image data being defined by the RGB multi-valued data to have a uniform color in a predetermined pixel area larger than the mesh;

color-compensating each component of RGB of the uniform image data by making reference to the look-up table to obtain RGB-compensated values of each pixels corresponding to each of the original pixels;

N-valuing the RGB-compensating values; and averaging the N-valued data in the predetermined area to prepare the three-dimensional color compensation table showing a relation between the RGB values of the uniform image data and the averaged values of the N-valued data of the RGB-compensation values, wherein the RGB-compensated values of each pixels are calculated from RGB values of the original pixels and errors between RGB values of periphery-processed pixels and RGB values obtained by making reference to the look-up table by the N-valued RGB-compensated values of the periphery-processed pixels.

2. The system according to claim 1, wherein the selecting means is provided with a plurality of keys provided on a panel and for selecting the type of the image input unit; and latch means for storing type data designated by the keys as an address for selecting one of the plurality of the three-dimensional color compensation tables.

3. The system according to claim 1, wherein the selecting means is a latch means for storing select data as an address for selecting the plurality of three-dimensional color compensation tables, the select data being for specifying the type of the image input unit, and output from the image input unit besides the multi-valued data.

4. The system according to claim 1, wherein the image output unit comprises:

a plurality of three-dimensional color compensation tables each tailored to the type of the image input unit to be connectable, and for compensating errors between colors to be actually output and colors to be actually represented;

latch means for storing type data representing the type of the image input unit as an address for selecting the three-dimensional color compensation tables;

an input buffer for temporarily storing the multi-valued data supplied from the image input unit;

digitizing means for digitizing color compensated data output, in accordance with the multi-valued data supplied from the input buffer, from one of the three-dimensional color compensation tables selected by the address stored in the latch means; and dot printing means for receiving the digitized data output from the digitizing means and color converted and for outputting a pseudo-color image.

5. A pseudo-color image output system, comprising:

an image input unit for reading a full-color image and outputting RGB multi-valued data of three primary colors; and an image output unit for digitizing the RGB multi-valued data of three primary colors output from the image input unit and for outputting a pseudo-color image by controlling a total area of color dots in a unit area, wherein the image input unit includes:

image input means for reading a full-color image in units of color components;

data converting means for converting the image data read by the image input means into RGB multi-valued data;

a plurality of three-dimensional color compensation tables, one for each type of image output unit connectable to the image input unit, for compensating errors between the output and input colors; and selecting means for selecting one of the three-dimensional color compensation tables depending on the type of the image output unit; and output buffer means for outputting, in accordance with RGB multi-valued data, color-compensated RGB multi-valued data from one of the three-dimensional color compensation tables selected by the selecting means, wherein each of the three-dimensional color compensation tables is prepared through the operation of:

preparing a plurality of test patterns output from the image output unit, the test patterns including all dot patterns which can be represented by the image output unit, each of the dot patterns being a mesh constituted by n×n dots (n is an integer of 2 or more) and defined by N-values (N=n×n+1) with respect to each of RGB;

reading the test patterns by the image input unit to measure the RGB values of each test pattern;

preparing a look-up table showing a relation between the RGB values of the mesh of the test patterns and the RGB values actually measured for the test patterns;

generating a plurality of uniform image data with respect to all colors which can be input as original pixels, each uniform image data being defined by the RGB multi-valued data to have a uniform color in a predetermined pixel area larger than the mesh;

color-compensating each component of RGB of the uniform image data by making reference to the look-up table to obtain RGB-compensated values of each pixels corresponding to each of the original pixels;

N-valuing the RGB-compensated values; and averaging the N-valued data in the predetermined area to prepare the three-dimensional color compensation table showing a relation between the RGB values of the uniform image data and the averaged values of the N-valued data of the RGB-compensated values, wherein the RGB-compensated values of each pixels are calculated from RGB values of the original pixels and errors between RGB values of periphery-processed pixels and RGB values obtained by making reference to the look-up table by the N-valued RGB-compensated values of the periphery-processed pixels.

6. The system according to claim 5, wherein the selecting means is a latch means storing select data as an address for selecting one of the plurality of three-dimensional color compensation tables, the select data being for specifying the type and output from the image output unit.

* * * * *